United States Patent
Yeo et al.

(10) Patent No.: US 10,684,719 B2
(45) Date of Patent: Jun. 16, 2020

(54) APPARATUS FOR SENSING TOUCH PRESSURE

(71) Applicants: AMOGREENTECH CO., LTD., Gimpo-si, Gyeonggi-do (KR); AMOSENSE CO., LTD., Chungcheongnam-do (KR)

(72) Inventors: In-Tae Yeo, Gangseo-gu Seoul (KR); Byoung-Su Jin, Gyeonggi-do (KR); In Yong Seo, Seoul (KR); Sung-Baek Dan, Hwaseong-si (KR)

(73) Assignees: AMOGREENTECH CO., LTD., Gimpo-Si, Gyeonggi-Do (KR); AMOSENSE CO., LTD., Chungcheongnam-Do (KR)

( * ) Notice: Subject to any disclaimer, the term of this patent is extended or adjusted under 35 U.S.C. 154(b) by 114 days.

(21) Appl. No.: 15/766,282

(22) PCT Filed: Oct. 4, 2016

(86) PCT No.: PCT/KR2016/011088
§ 371 (c)(1),
(2) Date: Apr. 5, 2018

(87) PCT Pub. No.: WO2017/061749
PCT Pub. Date: Apr. 13, 2017

(65) Prior Publication Data
US 2018/0300005 A1 Oct. 18, 2018

(30) Foreign Application Priority Data

Oct. 5, 2015 (KR) .......................... 10-2015-0139983
Dec. 24, 2015 (KR) .......................... 10-2015-0186730
(Continued)

(51) Int. Cl.
*G06F 3/044* (2006.01)
*G06F 3/041* (2006.01)
(Continued)

(52) U.S. Cl.
CPC .............. *G06F 3/0414* (2013.01); *B32B 7/12* (2013.01); *G01L 1/146* (2013.01); *G06F 1/1643* (2013.01);
(Continued)

(58) Field of Classification Search
None
See application file for complete search history.

(56) References Cited

U.S. PATENT DOCUMENTS 5,369,228 A * 11/1994 Faust ...................... G06F 3/045
178/18.05
7,538,760 B2 * 5/2009 Hotelling .............. G06F 3/0414
178/18.06
(Continued)

FOREIGN PATENT DOCUMENTS

JP 7-36623 A 2/1995
KR 20040106447 A 12/2004
(Continued)

OTHER PUBLICATIONS

Machine translation of KR 101248410 B1 into English. (Year: 2013).*
(Continued)

*Primary Examiner* — Brian M Butcher
(74) *Attorney, Agent, or Firm* — BakerHostetler

(57) ABSTRACT

The present disclosure relates to an apparatus for sensing touch pressure. The apparatus for sensing touch pressure, according to one mode of the present disclosure, includes: a first substrate provided with a first electrode unit formed thereon; a second substrate provided with a second electrode
(Continued)

unit formed thereon; and a porous membrane member provided between the first substrate and the second substrate and deformed or restored according to touch pressure applied to the first substrate.

15 Claims, 8 Drawing Sheets

(30) Foreign Application Priority Data

| | | |
|---|---|---|
| Jan. 11, 2016 | (KR) | 10-2016-0003221 |
| Feb. 2, 2016 | (KR) | 10-2016-0013081 |
| Aug. 10, 2016 | (KR) | 10-2016-0101771 |

(51) Int. Cl.
*B32B 7/12* (2006.01)
*G01L 1/14* (2006.01)
*G06F 3/045* (2006.01)
*G06F 1/16* (2006.01)

(52) U.S. Cl.
CPC .............. *G06F 3/044* (2013.01); *G06F 3/045* (2013.01); *G06F 2203/04112* (2013.01)

(56) References Cited

U.S. PATENT DOCUMENTS

| | | |
|---|---|---|
| 7,595,788 B2 | 9/2009 | Son |
| 8,094,134 B2 | 1/2012 | Suzuki et al. |
| 2011/0157087 A1* | 6/2011 | Kanehira .............. G06F 3/0414 345/174 |
| 2012/0256838 A1 | 10/2012 | Lee et al. |

FOREIGN PATENT DOCUMENTS

| | | |
|---|---|---|
| KR | 20110042924 A | 4/2011 |
| KR | 20120082631 A | 7/2012 |
| KR | 101452748 B1 | 10/2014 |
| KR | 101637900 B1 | 7/2016 |
| WO | 2015077200 A1 | 5/2015 |

OTHER PUBLICATIONS

International Search Report for International Application No. PCT/KR2016/011088 dated Jan. 4, 2017, 2 pages.
International Written Opinion for International Application No. PCT/KR2016/011088 dated Jan. 4, 2017, 8 pages.

* cited by examiner

APPARATUS FOR SENSING TOUCH PRESSURE

CROSS-REFERENCE TO RELATED APPLICATIONS

This application is a national phase entry under 35 U.S.C. § 371 of International Patent Application PCT/KR2016/011088, filed Oct. 4, 2016, designating the United States of America and published as International Patent Publication WO 2017/061749 A1 on Apr. 13, 2017, which claims the benefit under Article 8 of the Patent Cooperation Treaty to Korean Patent Application Serial Nos. 10-2016-0101771 filed Aug. 10, 2016; 10-2016-0013081 filed Feb. 2, 2016; 10-2016-0003221 filed Jan. 11, 2016; 10-2015-0186730 filed Dec. 24, 2015; and 10-2015-0139983 filed Oct. 5, 2015.

TECHNICAL FIELD

This application relates to an apparatus for sensing touch pressure. More particularly, this application relates to an apparatus for measuring or sensing touch pressure applied by a user by detecting a capacitance change that occurs due to deformation and reversion of a nano-membrane member upon exertion and removal of the touch pressure applied by the user.

BACKGROUND

A typical touch screen panel is manufactured by bonding a touch sensor composed of a transparent film and transparent electrodes on the transparent film, to a cover glass panel.

A touch screen panel detects a touch operation on the screen based on a capacitance change by using a touch sensor.

In addition, a touch screen panel performs only a two-dimensional detection using a touch sensor. That is, it detects a touch operation and a touch position only on a two-dimensional plane.

To satisfy diverse user demands, for example, U.S. Pat. No. 7,595,788 discloses a touch pressure detection sensor for a touch screen panel, which is configured such that touch pressure is first detected and then a different application program is executed according to the detected touch pressure.

However, the conventional touch pressure detection sensor for a touch screen panel has a problem that it is difficult to accurately and precisely sense changes in touch pressure, thereby being unable to finely grade the touch pressure according to the magnitude of the touch pressure.

Moreover, in the past, when adjusting the thickness of the touch pressure sensing apparatus according to the design change intension of the user, since the gap between the electrodes for sensing the touch pressure is increased, resulting in the reduction in capacitance, there was a problem that the measurement performance was degraded.

In addition, its manufacturing process is complicated, resulting in an increased manufacturing cost. Therefore, the price competitiveness of the touch screen panel in the market is weakened.

BRIEF SUMMARY

Technical Problem

An objective of this disclosure is to provide a touch pressure sensing apparatus being capable of precisely measuring or sensing touch pressure applied by a user, by detecting a change in capacitance attributable to deformation and reversion of a nano-membrane member according to the touch pressure applied by the user.

Another objective of the disclosure is to provide a touch pressure sensing apparatus that is relatively thin and uniform in thickness and has an excellent self-reversing property by employing a nano-membrane member.

A further objective of this disclosure is to provide a touch pressure sensing apparatus provided with a spacer member, the apparatus being capable of measuring a capacitance value with the same precision as the case where the spacer member is not used, while employing the spacer member that increases the thickness thereof.

A yet further objective of the disclosure is to provide a touch pressure sensing apparatus having a nano-membrane provided with an air passage through which air passes, whereby the touch pressure sensing apparatus does not easily bend in a state in which it is aligned well and stacked.

Technical Solution

According to the best mode of this disclosure, a touch pressure sensing apparatus includes a first substrate provided with a first electrode unit, a second substrate provided with a second electrode unit, and a porous membrane member provided between the first substrate and the second substrate, the porous membrane member deforming or reverting according to touch pressure applied to the first substrate.

According to the best mode of the disclosure, the membrane member may be a web-shaped nano-membrane.

According to the best mode of this disclosure, a spacer member may be further provided between the membrane member and the second substrate to space the membrane member and the second substrate from each other.

The spacer member may be thicker than the membrane member.

The spacer member may have higher rigidity than the membrane member.

The spacer member may be made of conductive woven fabric that is prepared by plating non-conductive woven fabric with a metal.

According to another mode of the disclosure, a perimeter support member may be further provided between the first substrate and the second substrate in a manner of surrounding outer flank surfaces of the membrane member and the spacer member.

This disclosure may be further provided with a first adhesive layer for bonding the first substrate and the membrane member to each other, the first electrode unit may include a plurality of sensing electrodes, and the sensing electrodes may be configured to be in direct contact with the membrane member.

The first adhesive layer may have openings corresponding to the sensing electrodes.

The first substrate may have one or more substrate passing through-holes extending to the respective openings.

A lower support member provided under the second substrate may be further included.

The second electrode unit may be provided on a first surface of the second substrate wherein the first surface is a surface facing the first substrate.

According to a further mode of the disclosure, the touch pressure sensing apparatus may further include a second adhesive layer for bonding the membrane member and the spacer member to each other and a third adhesive layer for bonding the spacer member and the second substrate to each other and for bonding the perimeter support member and the second substrate to each other.

This disclosure may further include a touch pressure sensing unit connected to the first electrode unit and the second electrode unit to measure a capacitance value between the first electrode unit and the second electrode unit, thereby sensing touch pressure applied to the first substrate.

According to a yet further mode of this disclosure, there is provided a touch pressure sensing apparatus including: a first substrate provided with a first electrode unit; a second substrate provided with a second electrode unit; a porous membrane member provided between the first substrate and the second substrate, the porous membrane member deforming and reverting according to touch pressure applied to the first substrate; and conductive powder dispersed in the porous membrane member to implement an additional operation mode by causing short-circuiting between the first electrode unit and the second electrode unit besides a touch pressure sensing mode in which touch pressure applied to the first substrate is sensed as a change in capacitance between the first electrode unit and the second electrode unit.

Advantageous Effects

As described above, according to the disclosure, since the nano-membrane member is used, the touch pressure sensing apparatus that is thin, has a uniform thickness, and has a good self-reverting property can be provided.

In addition, even with the spacer member additionally included, the apparatus of the disclosure can maintain the performance of sensing a capacitance value with the same precision as an apparatus that does not include the spacer member.

In addition, according to this disclosure, since the first substrate is provided with the substrate passing through-hole and the first adhesive layer is provided with the opening, an air passage can be provided in the nano-membrane member. Therefore, it is possible to prevent the apparatus of the disclosure from being structurally deformed from a well-aligned and stacked state even after undergoing many times of exertion of touch pressure.

In addition, according to this disclosure, the spacer member is provided to enhance the elastic supporting force of the nano-membrane member and to improve the uniform flatness of the underlying layer of the nano-membrane member.

In addition, according to the disclosure, since the nano-membrane member contains conductive powder, it is possible to set apparent touch pressure sensing grades by using short-circuiting resulting from an event in which the nano-membrane member contracts to the extent exceeding a predetermined limit.

In addition, this disclosure has the effects of reducing the manufacturing cost and improving the production rate, thereby securing economic feasibility and raising competitiveness of a touch screen panel.

DETAILED DESCRIPTION

Figure 1:
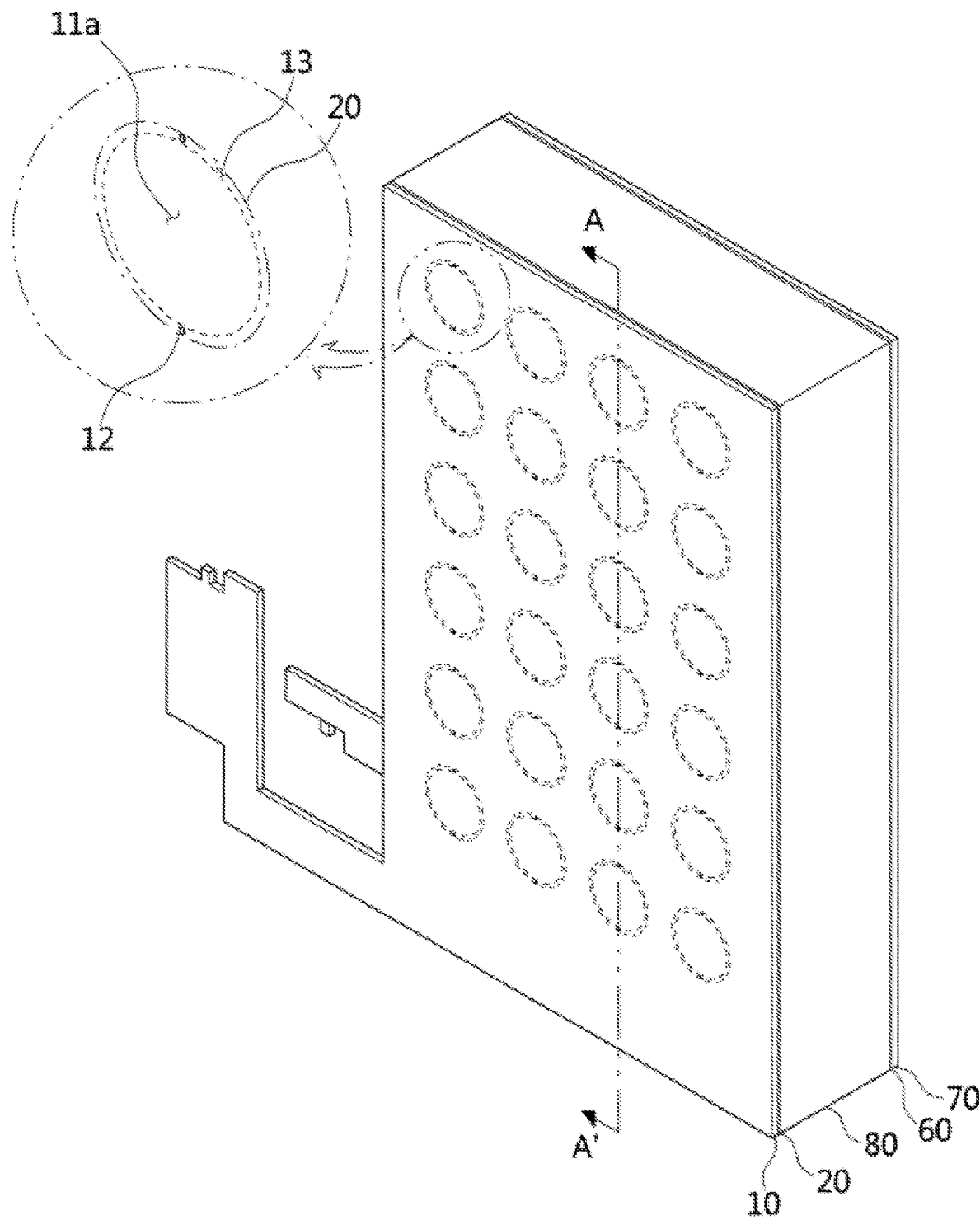
FIG. 1 is a perspective view of a touch pressure sensing apparatus according to one mode of the disclosure.

In order to help thorough understanding of the disclosure, the best mode will be described with reference to the accompanying drawings. The mode of this disclosure described below may be modified into various forms, so that the scope of the disclosure should not be construed as being limited to the mode described in detail below. The best mode is provided to more fully describe this disclosure to those skilled in the art. Therefore, throughout the drawings, the shapes and the like of elements may be exaggerated for the purpose of clarity. It should be noted that in the drawings, the same elements are denoted by the same reference numerals. Detailed descriptions of known features and configures that are likely to obscure the gist of the disclosure will be omitted.

A touch pressure sensing apparatus according to one mode of this disclosure can sense touch pressure up to the extent of the magnitude (touch pressure) of a commonly-performed touch operation in typical use. The touch pressure sensing apparatus described below may include a component, such as a touch input device, to determine presence and absence of a touch operation and determine a touch position. The component to determine the absence or presence of a touch operation and the touch position may include an electrode layer (touch sensor) for sensing a touch operation, a driver circuit for applying a signal to the electrode layer, and a controller for controlling the driver circuit. As the method of determining the presence or absence of a touch operation or determining a touch position, there are various methods: capacitive type, resistive type (touch pressure sensing type), etc. Most of electronic devices such as smart phones use a capacitive type technology. The capacitive type device typically uses a projected capacitive (PCAP) touch screen. The PCAP touch screens are categorized into self-capacitive types using self capacitance and mutual-capacitive type using mutual capacitance.

Herein, only a touch pressure sensing apparatus for sensing or measuring the magnitude of touch pressure will be described, but a conventional technology of determining the absence or presence of a touch operation or determining a touch position will not be described.

Figure 2:
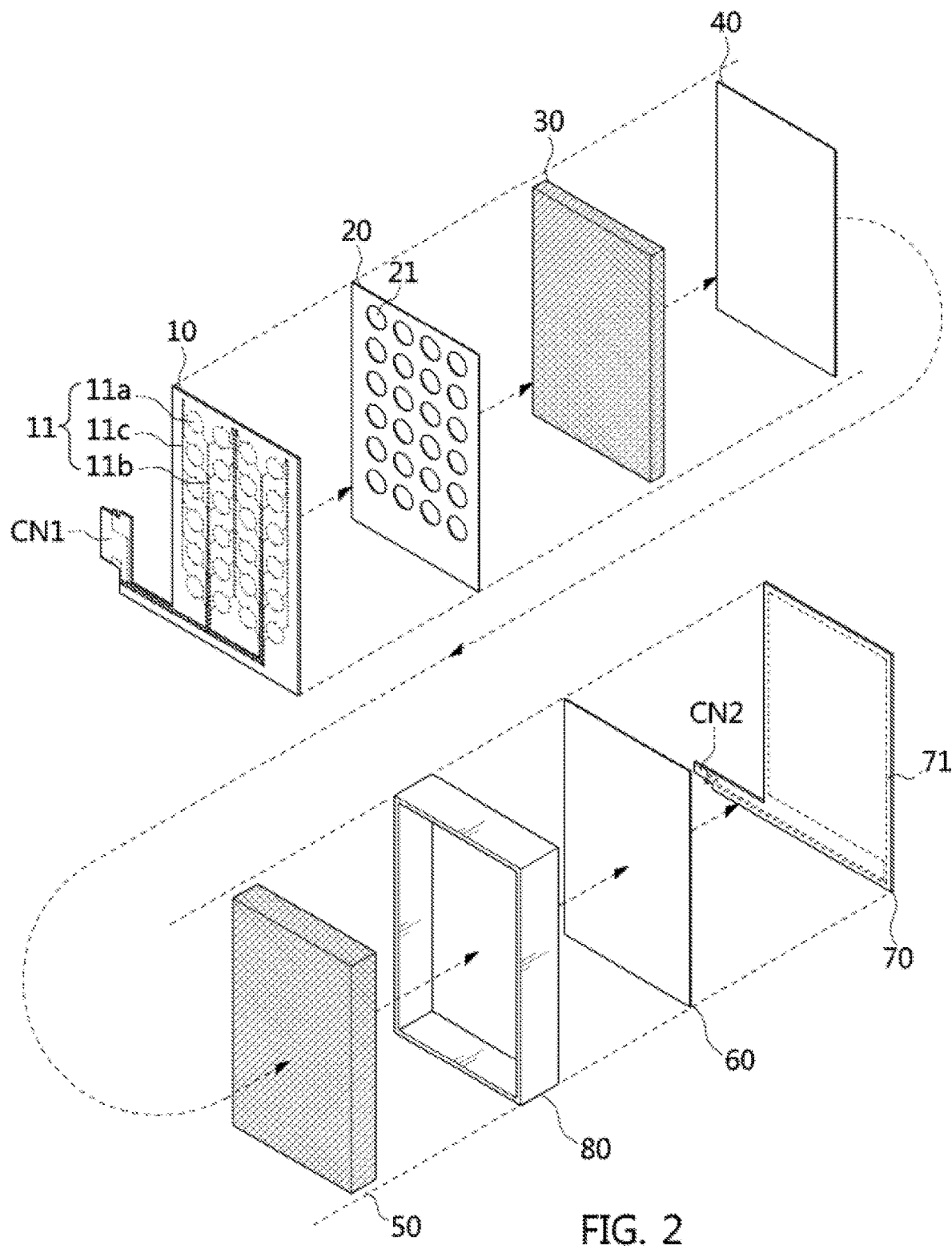
FIG. 2 is an exploded perspective view of the touch pressure sensing apparatus of FIG. 1.
Figure 3:
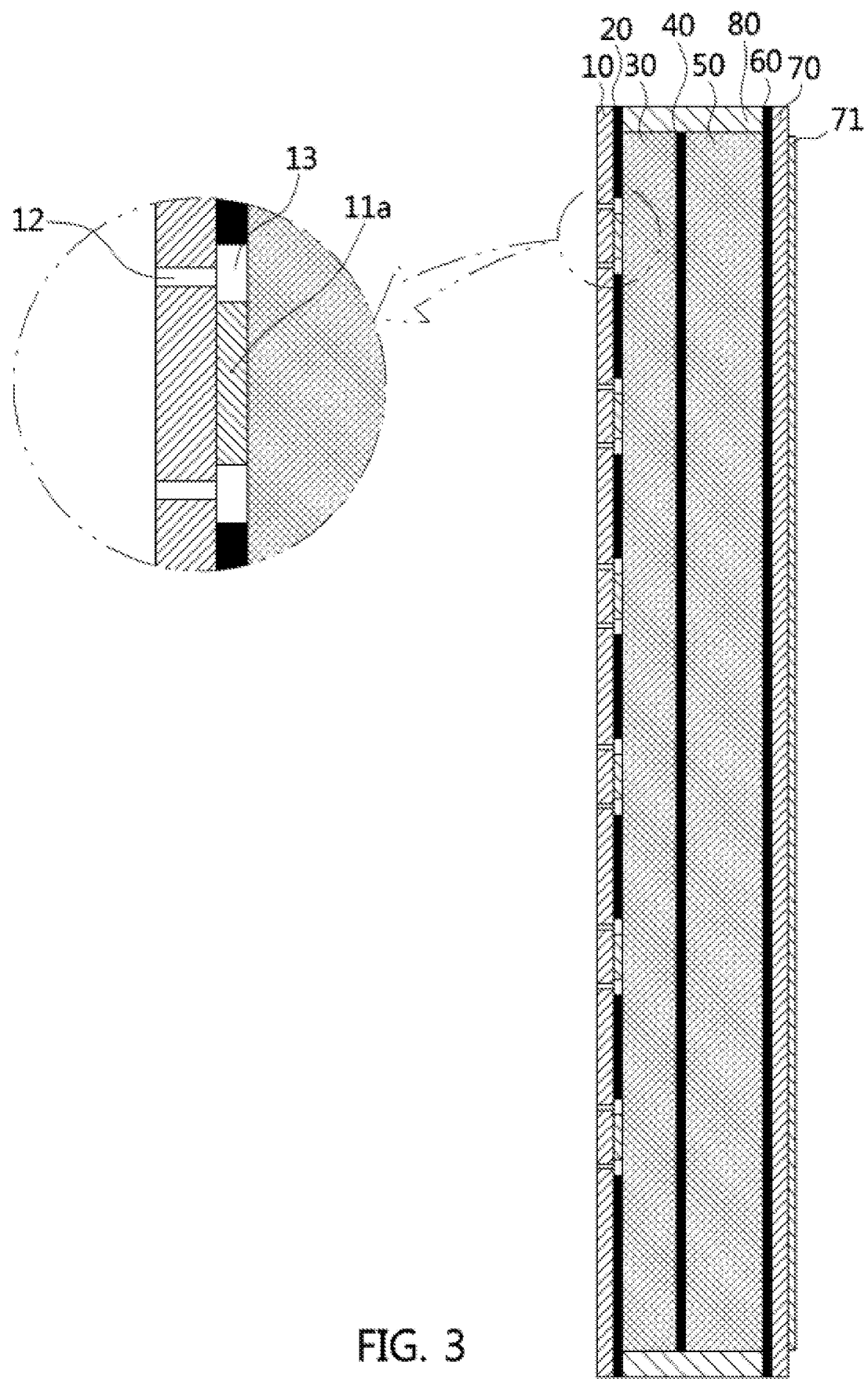
FIG. 3 is a cross-sectional view taken along a line A-A' on the touch pressure sensing apparatus of FIG. 1.

FIG. 1 is a perspective view of a touch pressure sensing apparatus according to one mode of the disclosure, FIG. 2 is an exploded perspective view of the touch pressure sensing apparatus of FIG. 1, FIG. 3 is a cross-sectional view taken along a line A-A' on the touch pressure sensing apparatus of FIG. 1.

As illustrated in FIG. 1 to FIG. 3, according to one mode of the disclosure, a touch pressure sensing apparatus 100 includes a first substrate 10, a first adhesive layer 20, a nano-membrane member 30, a second adhesive layer 40, a spacer member 50, a third adhesive layer 60, a second substrate 70, and a perimeter support member 80.

The nano-membrane member 30 refers to a web-shaped membrane made of fiber strains having a mean diameter of nano meters (mm) less than one micrometer (μm). Specifically, the nano-membrane member 30 is a type of porous unwoven fabric with pores (for example, accounting for 30% or more), which is prepared by producing fiber strains having a diameter of several hundreds of nanometers (for example, 600 to 700 nm) from polymer material through electrospinning and then stacking the fiber strains disorderly.

A first surface of the first substrate 10 is provided with a first electrode unit 11 through which an electric current flows, wherein the first surface is a surface facing the nano-membrane member 30. The first electrode unit 11 may include a plurality of sensing electrodes 11a, a plurality of main connection lines 11b, and a plurality of dummy connection lines 11c. The sensing electrodes 11a are arranged in a matrix of M rows and M columns, the rows being spaced from each other and the columns being spaced from each other. The sensing electrodes 11a are arranged to correspond to respective cells that are minimum units for measuring touch pressure. Herein, the case where there are sensing electrodes of a 6×4 matrix will be described. Each of the sensing electrodes 11a has a polygonal plane shape or a round plane shape. Herein, as illustrated in FIG. 1 and FIG. 2, the case where the sensing electrodes have a round shape will be described. The main connection lines 11b connect the sensing electrodes 11a provided for the respective cells and a driver signal unit (now illustrated) for supplying a drive signal. A first connector CN1 is a connection terminal for connecting a bundle of the main connection lines 11b connected to the sensing electrodes 11a arranged in the respective cells to the driver signal unit (not illustrated). The first connector CN1 may be formed as an extension extending from a first end of the first substrate 10.

The dummy connection lines 11c function to compensate for length differences among the main connection lines 11b connected to the respective sensing electrodes 11a, thereby leveling the capacitance values of the respective cells to be uniform. That is, when there is variation in the length of the main connection lines 11b connected to the respective sensing electrodes 11a, the capacitance values of the respective cells vary from cell to cell. For this reason, to uniformize the capacitance values of the respective cells, the dummy connection lines 11c are used to offset the differences in the length of the main connection lines 11b. The dummy connection lines 11c are arranged on the opposite side of the main connection lines 11b with respect to the respective sensing electrodes 11a. However, the dummy connection lines 11c are formed to be parallel to the main connection lines 11b. For each of the sensing electrodes 11a, the sum of the corresponding main connection line 11b and the corresponding dummy connection line 11c is set to be the same value.

The first substrate 10 is made of a transparent film selected among a polyimide (PI) film, a polyethylene naphthalate (PEN) film, a polyethylene terephthalate (PET) film, a polycarbonate (PC) film, a poly styrene sulfonate (PSS) film. Alternatively, the first substrate 10 may be made of a transparent film selected among engineering plastics. The first electrode unit 11 is a transparent electrode that is optically transmissive and electrically conductive and is made of indium tin oxide (ITO), graphene, carbon nanotubes, or Ag nanowire. The first substrate 10 may have a thickness of 50 μm, for example. On the other hand, the first substrate 10 and the first electrode unit 11 may be made of an opaque material. When the first electrode unit 11 is made of an opaque material, it may be made of a metal such as Cu, Ag, Au, and Al.

When a touch operation is performed on the first substrate 10, the first substrate 10 may be locally deformed due to the touch pressure. When the first substrate 10 is deformed due to the touch pressure, a gap size between the first electrode unit 11 and a second electrode unit 71 to be described later changes, resulting in a change in capacitance.

The first adhesive layer 20 is provided between the first substrate 10 and the nano-membrane member 30 to bond them each other. The first adhesive layer 20 may have a plurality of through-hole-type openings 21 at positions corresponding to the respective sensing electrodes 11a of the first electrode unit 11, thereby allowing the sensing electrodes 11a of the first electrode unit 11 to be in direct contact with the nano-membrane member 30.

As described above, the sensing electrodes 11a are arranged within the openings 21, respectively. Alternatively, each of the openings 21 may have an increased area so that multiple sensing electrodes 11a can be disposed within one opening 21. The arrangement in which the openings 21 and the sensing electrodes 11a are arranged on one-to-one correspondence has an advantage over the arrangement in which the openings 21 and the sensing electrodes 11a are arranged on one-to-multiple correspondence in terms of durability. That is, with the former arrangement, it is possible to better prevent the first substrate 10 from being misaligned or displaced when touch pressure is applied to the first substrate 10 and to more securely maintain a gap between the first substrate 10 and the nano-membrane member 30.

When the first adhesive layer 20 is disposed between the first substrate 10 and the nano-membrane member 30, adhesive portions thereof are disposed in areas between the sensing electrodes 11a, i.e., areas where the main connection lines 11b and the dummy connection lines 11c are provided, and non-adhesive portions (i.e., openings 21) thereof are disposed in areas where the sensing electrodes 11a are provided, respectively. That is, the first adhesive layer 20 functions to demarcate each of the plurality of sensing electrodes 11a, thereby enabling sensing of pressure change for each cell.

Here, preferably, each opening 21 of the first adhesive layer 20 is larger than the area of the corresponding sensing electrode 11a.

Due to the openings 21, the sensing electrodes 11a of the first substrate 10 and the nano-membrane member 30 can come in direct contact with each other. Since the first adhesive layer 20 is not present between the sensing electrodes 11a and the nano-membrane member 30, the sensing electrodes 11a and the membrane member 30 can come into contact with each other. Accordingly, the capacitance of the adhesive layer 20 can be excluded from the measured capacitance. In addition, the accuracy of the measured capacitance can be improved because the surface irregularity, which inevitably occurs when the first adhesive layer 20 is disposed between the first electrodes and the nano-membrane member, is removed.

Preferably, the sensing electrodes 11a has a thickness equal to or larger than that of the first adhesive layer 20. Preferably, the first adhesive layer 20 has a thickness of 5 μm.

As described above, since the opening 21 of the first adhesive layer 20 is larger than the sensing electrode 11a, there may be a clearance 13 around the sensing electrode 11a. The first substrate 10 may have one or more substrate passing through-holes 12 which extend through the first substrate 10 to reach the clearance 13 and through which air can be introduced or discharged. The substrate passing through-holes 12 function as vent holes through which air is introduced or discharged when the nano-membrane member 30 is compressed by the touch pressure applied by the user or reverted when the touch pressure is removed. Since the nano-membrane member 30 is a porous member with pores dispersed therein, a large volume of air may be captured in the nano-membrane member 30. Therefore, with the presence of the substrate passing through-holes 12, when the touch pressure is applied or removed, air can be introduced into and discharged out of the nano-membrane member 30 through the substrate passing through-holes 12. The substrate passing through-holes 12 provided in the first substrate 10 and the openings 21 provided in the first adhesive layer 20 form, in conjunction with each other, air passage channels through which air captured in the nano-membrane member 30 can be discharged. Therefore, even though touch pressure is applied multiple times to the touch screen device, it is possible to prevent the well-aligned or stacked state of the first substrate 10 from being structurally deformed or from collapsing.

Settings of the size of the substrate passing through-holes 12 may vary depending on the compressing or reverting speed of the nano-membrane member 30. For example, the substrate passing through-holes 12 may have a diameter of 0.03 to 5 mm.

The nano-membrane member 30 may be made of an insulating material having elastic restoring force. For example, the nano-membrane member 30 may be a nano-fiber member prepared by electro-spinning a polymer material. That is, the nano-membrane member 30 may be made of nano-fiber that is manufactured by subjecting a polymer spinning solution composed of polymer resin and solvent to electro-spinning. The polymer resin may be any one selected among polyvinylidene fluoride (PVDF), polystyrene (PS), poly(methylmethacrylate) (PMMA), and polyacrylonitrile (PAN). The polymer spinning solution may contain conductive powder such as copper powder, silver powder, aluminum powder, gold powder, or a mixture of two or more kinds of powder as necessary. When the conductive power is contained in the polymer spinning solution, it may be uniformly distributed in the nano-fiber by being incorporated into the nano-fiber through the electro-spinning. As described above, the thickness of the nano-membrane member 30 can be adjusted to be thin and uniformly regulated through the electro-spinning. The nano-membrane member 30 may be formed to have a thickness within a range of 10 to 20 μm. Furthermore, the nano-membrane member 30 is an excellent self-reversible member.

Alternatively, the nano-membrane member 30 may be substituted with a synthetic member made of a material selected among a foamed synthetic resin having a sponge form, a synthetic rubber material, silicone gel, silicones, glycerol polymer, and combinations of two or more kinds thereof. The nano-membrane member 30 is advantageous over the enumerated alternatives because it can be formed to be thinner, has better elastic restoration force, and can be easily controlled in thickness during manufacturing thereof. That is, the alternatives described above are relatively difficult to be manufactured to have a small and uniform thickness and to have a good elastic restoration force.

When the nano-membrane member 30 is formed of nano-fiber, silicone gel or silicones may be provided between fiber strains.

Since the nano-membrane member 30 is self-reversible, when the gap between the electrodes is reduced due to the deformation of the nano-membrane member 30 upon application of the touch pressure, the capacitance changes so that the touch can be detected. Afterward, when the touch pressure is removed, the nano-membrane member 30 reverts to its original state within one second. This property enables quick and precise sensing of the user's touching-operation input even after a touching operation is performed multiple times.

The nano-membrane member 30 becomes thinner when disposed on the first substrate 10 and compressed by touch pressure than an original state in which the nano-membrane member 30 is not compressed. That is, since the nano-membrane member 30 is compressed to be thinner than the original state (initial state immediately after manufacturing), its elastic restoration force is increased. For example, when the initial thickness (thickness before being compressed) of the nano-membrane member 30 is referred to as d2 and the deformed thickness (thickness after being compressed) of the nano-membrane member 30 is referred to as d1, the deformed thickness d1 satisfies the condition of $0.2 \times d2 \le d1 \le 0.9 \times d2$. For example, the thickness of the nano-membrane member 30 may be 10 to 20 μm and the diameter of the fiber of the nano-membrane member 30 may be 600 to 700 nm. In addition, the ratio d1:d3 of the thickness d1 of the nano-membrane member 30 and the fiber diameter d3 of the nano-membrane member 30 may be set within a range of 1:0.007 to 1:0.06 (d1:d3=1:0.007 to 1:0.06).

The second adhesive layer 40 is disposed between the nano-membrane member 30 and the spacer member 50 so that the nano-membrane member 30 and the spacer member 50 can be bonded to each other. The second adhesive layer 40 may be formed to have a thickness of 10 μm that is larger than the thickness of the first adhesive layer 20 to increase the adhesiveness between the nano-membrane member 30 and the spacer member 50.

The spacer member 50 is interposed between the nano-membrane member 30 and the second substrate 70, thereby spacing the nano-membrane member 30 and the second substrate 70 from each other. The nano-membrane member 30 is formed to be very thin because it is formed of fiber having a nano-size diameter. Therefore, even with the presence of the spacer member 50, the total thickness of the whole body of the touch pressure sensing apparatus 100 can be adjusted to be within a required range. Since the spacer member 50 is made of a material having elasticity, the spacer member 50 can partially absorb the touch pressure. Therefore, as compared to the case where the touch pressure is applied only to the nano-membrane member 30 that is very thin, it is possible to improve the precision of measurement. Accordingly, the spacer member 50 preferably has a thickness (for example, 90 μm) thicker than that of the nano-membrane member 30.

When the touch pressure is applied only to the nano-membrane member 30, since the distance between the first substrate 10 and the second substrate 70 is small, deformation of the membrane occurs not only at the position where the touch pressure is applied but also at the surrounding area thereof, which results in deterioration in the performance of sensing the touch pressure.

The spacer member 50 may be an electrically conducive member. Since the spacer member 50 is made of an electrically conductive material, although it has a predetermined thickness, the capacitance values measured at the upper surface and the lower surface of the spacer member 50 are equal to each other.

The spacer member 50 may be made of a metal, such as Ni, Ag, Cu, Al, or Au, having an electrical conductivity, or a metal alloy thereof. However, preferably, the spacer member 50 may be made of conductive unwoven fabric prepared by plating (or coating) non-conductive unwoven fabric with a metal. When the spacer member 50 is made of conductive unwoven fabric, it is lighter, its thickness can be more easily controlled, and its manufacturing cost is lower than a metal spacer member.

The spacer member 50 is disposed under the nano-membrane member 30, thereby reinforcing the elastic supporting force of the nano-membrane member 30 and preventing an underlying portion of the nano-membrane member 30 from being deformed by the touch pressure applied by the user. When the touch pressure is applied by the user, although the upper surface of the nano-membrane member 30 is locally deformed by the touch pressure, the lower surface of the nano-membrane member 30 needs not be locally deformed and needs to remain flat. To this end, it is preferable that the spacer member 50 has higher rigidity than the nano-membrane member 30.

A third adhesive layer 60 is disposed between the spacer member 50 and the second substrate 70 for the bonding purpose thereof. The third adhesive layer 60 may be thicker than the first adhesive layer 20 to securely bond the spacer member. For example, the third adhesive layer 60 has a thickness of about 10 μm.

For sake of ease of designing of the second substrate 70, the second electrode unit 71 may be formed on an upper or lower surface of the second substrate 70, wherein the upper or lower surface is a surface facing the first electrode unit 11 of the first substrate 10. The second substrate 70 has a thickness of about 50 μm like the first substrate 10. That is, when the second electrode unit 71 is formed on a surface facing the spacer member 50, the second electrode unit 71 comes into direct contact with the spacer member 50, resulting in an increase in capacitance as compared with the case where the second electrode unit is formed on the opposite surface. Further, since the second electrode unit 71 is buried in the second substrate 70, the second electrode unit 71 can be protected from external environmental factors such as moisture. When the second electrode unit 71 is formed on a surface which is opposite to the surface exposed to the outside, the second electrode unit 71 may be connected to internal connection terminals of various terminal devices (for example, smart phones, tablet computers, etc.) to which the touch pressure sensing apparatus 100 of this disclosure can be mounted and thus may be used as a common ground electrode. In this case, the second electrode unit 71 may be entirely covered by an additional substrate, layer, member, or the like (not illustrated) so that it can be protected from external environmental factors such as moisture. A second connector CN2 is a connection terminal for connecting the second electrode unit 71 to a drive signal unit (not illustrated) or a ground potential. The second connector CN2 may be formed to extend from an end of the second substrate 700.

The second electrode unit 71 may have a flat plate shape covering the entire area of one surface of the second substrate 70. That is, the second electrode unit 71 is formed to face the first electrode unit 11 for each cell. The second electrode unit 71 may be formed to have a thickness of 1 μm. Although an example in which a ground potential is applied to the second electrode unit 71 has been described, the potential applied to the second electrode unit 71 may not be limited to the ground potential. A specific potential may be applied to the second electrode unit 71. Thus, for all of the cells, the capacitance between the first electrode unit 11 and the second electrode unit 71 may be uniform.

A lower support member (not illustrated) provided under the second substrate 70 to support the nano-membrane member 30 and the spacer member 50 from underside may be further included. The lower support member may be connected to a frame of each of various terminal devices to which the touch pressure sensing apparatus 100 of the disclosure can be mounted, thereby supporting and securing the touch screen so as to endure the touch pressure applied by the user. That is, the lower support member prevents the second substrate 70 from being bent when the touch pressure is applied to the first substrate 10 from above, so that the touch pressure can be accurately sensed.

Like the first substrate, the second substrate 70 may be made of a transparent film selected among a polyimide (PI) film, a polyethylene naphthalate (PEN) film, a polyethylene terephthalate (PET) film, a polycarbonate (PC) film, a poly styrene sulfonate (PSS) film, or a transparent film selected among engineering plastics.

A perimeter support member 80 is disposed between the first substrate 10 and the second substrate 70 and configured to surround outer flank surfaces of the nano-membrane member 30 and the spacer member 50. The perimeter support member 80 may be bonded to the first substrate 10 by the first adhesive layer 20, and to the second substrate 70 by the third adhesive layer 60. The perimeter support member 80 fixes and maintains a state in which the nano-membrane member 30 and the spacer member 50 are aligned and stacked, so that the nano-membrane member 30 and the spacer member 50 can maintain their aligned and stacked state even after touch pressure is applied multiple times. That is, the perimeter support member 80 has a sealing function of preventing deformation of the aligned and staked state of the nano-membrane member 30 and the spacer member 50. The perimeter support member 80 prevents the entire structure of the touch pressure sensing apparatus 100 from being deformed.

As described above, since the perimeter support member 80 is arranged to surround the outer flank surfaces of the nano-membrane member 30 and the spacer member 50, it can reinforce the elastic supporting force in the touch region and maintains the spacing between the first substrate 10 and the second substrate 70, thereby preventing the well-aligned state of the nano-membrane member 30 and the spacer member 50 from being deformed by the touch pressure, and preventing the second substrate 70 from being deformed when the touch pressure is applied. Therefore, it is possible to prevent the sensing of the touching operation from being deteriorated due to the deformation of the second substrate 70.

The perimeter support member 80 may be made of a soft material having a large elastic coefficient. For example, the perimeter support member 80 may be made of urethane foams or PORON®, a sponge rubber having elasticity (for example, closed pore type sponge), or the like.

The perimeter support member 80 may have a through hole (not illustrated) extending to the first substrate 10 or the second substrate 70 so that external air can be introduced into the touch pressing sensing apparatus or internal air can be discharged through the through hole. In this case, the function of the substrate passing through-hole 12 of the first substrate 10 may be performed by the through hole provided in the perimeter support member 80.

Herein, although an example in which the first electrode unit 11 includes a plurality of sensing electrodes 11*a* corresponding to a plurality of cells, respectively, and the second electrode unit 71 has a flat plate shape serving as a common ground electrode has been provided, the first electrode unit 11 and the second electrode unit 71 may correspond to an X-axis sensing circuit and an Y-axis sensing circuit, respectively. In this case, the first electrode unit 11 may form the X-axis sensing circuit including a plurality of X-axis electrodes arranged and spaced from each other in a horizontal direction, and the second electrode unit 71 may form the Y-axis sensing circuit including a plurality of Y-axis electrodes arranged and spaced from each other in a vertical direction. The X-axis electrodes and the Y-axis electrodes may have a diamond-shaped metal mesh form. That is, the X-axis sensing circuit includes a plurality of X-axis electrodes, each being connected to one another and each having a diamond-shaped metal mesh form, and the Y-axis sensing circuit includes a plurality of Y-axis electrodes, each being connected to one another and each having a diamond-shaped metal mesh form.

The first electrode unit 11 may be formed by depositing a deposition layer on the first substrate 10 through a physical vapor deposition (PVD) process and selectively etching the deposition layer. The PVD process may be any one of vacuum deposition, evaporation, ebeam deposition, laser deposition, sputtering, and arc ion plating. Here, on the deposition layer for forming the first electrode unit 11, a plating layer and an anti-oxidation layer may be additionally formed. Specifically, the deposition layer may be formed of a metal, such as copper (Cu), silver (Ag), gold (Au), or aluminum (Al), having high conductivity. In the case where the plating layer is added, a nonmetallic layer may be used. The plating layer is formed on the deposition layer through a plating process. The plating layer may be formed of a metal such as copper (Cu), silver (Ag), gold (Au), or aluminum (Al), having high conductivity. The anti-oxidation layer may be formed on the deposition layer or the plating layer, and it may be a copper oxide (CuO) layer. The second electrode unit 71 is formed in the same manner as the first electrode unit 11.

The first electrode unit 11 and the second electrode unit 71 are formed to have a line width and a thickness of 2 μm or less through the deposition and the subsequent etching. By using this method, it is possible to reduce the line width and thickness of the first electrode unit 11 and the second electrode unit 71 to 5 μm or less corresponding to the spacing of the electrodes. That is, it is possible to precisely form a fine pattern. Therefore, the main connection lines 11b and the dummy connection lines 11c can be formed as fine patterns.

The touch pressure sensing apparatus 100 may further include a touch pressure sensing unit (not illustrated) for recognizing a touch input of a user by sensing a change in capacitance attributable to the touch pressure. The touch pressure sensing unit is connected to the first electrode unit 11 and the second electrode unit 71, thereby sensing a change in capacitance between the first electrode unit 11 and the second electrode unit 71. The touch pressure sensing unit can perform multi-stage objects by determining multi-stage sections by using an electrical change, i.e., a capacitance change according to the touch pressure applied from the outside.

The nano-membrane member 30 may contain conductive powder distributed therein. When the nano-membrane 30 contracts to the extent exceeding a predetermined limit, an electrical short (short-circuiting) may occur. Due to this, the magnitude of the touch pressure can be graded into multiple grades. In this case, a conductive path is formed through the first electrode unit 11, the conductive powder contained in the nano-membrane member 30, and the second electrode unit 71, so that Off->On operation, i.e., short-circuiting may occur. This causes electrical shock to other circuits including the touch pressure sensing unit, increases power consumption, and deteriorates the durability of other electrical circuits connected to the touch pressure sensing sensor. A resistor (not illustrated) may be arranged to be connected in series with a connection line between the touch pressure sensing unit and the first electrode unit 11 or between the touch pressure sensing unit and the second electrode unit 71. When the nano-membrane member 30 excessively contracts and thus the short-circuiting occurs, the resistor protects other electric circuits including the touch pressure sensing unit from electrical shocks, thereby solving various problems accompanied by short-circuiting, such as an increase in power consumption, failure of an electrical circuit connected to the touch pressure sensing sensor, etc.

When the nano-membrane member 30 contains conductive powder, the touch pressure sensing unit can measure the resistance with respect to the current flowing through the first electrode unit 11 and the second electrode unit 71. The touch pressure sensing unit can sense the touch pressure based on a change in resistance.

Figure 4:
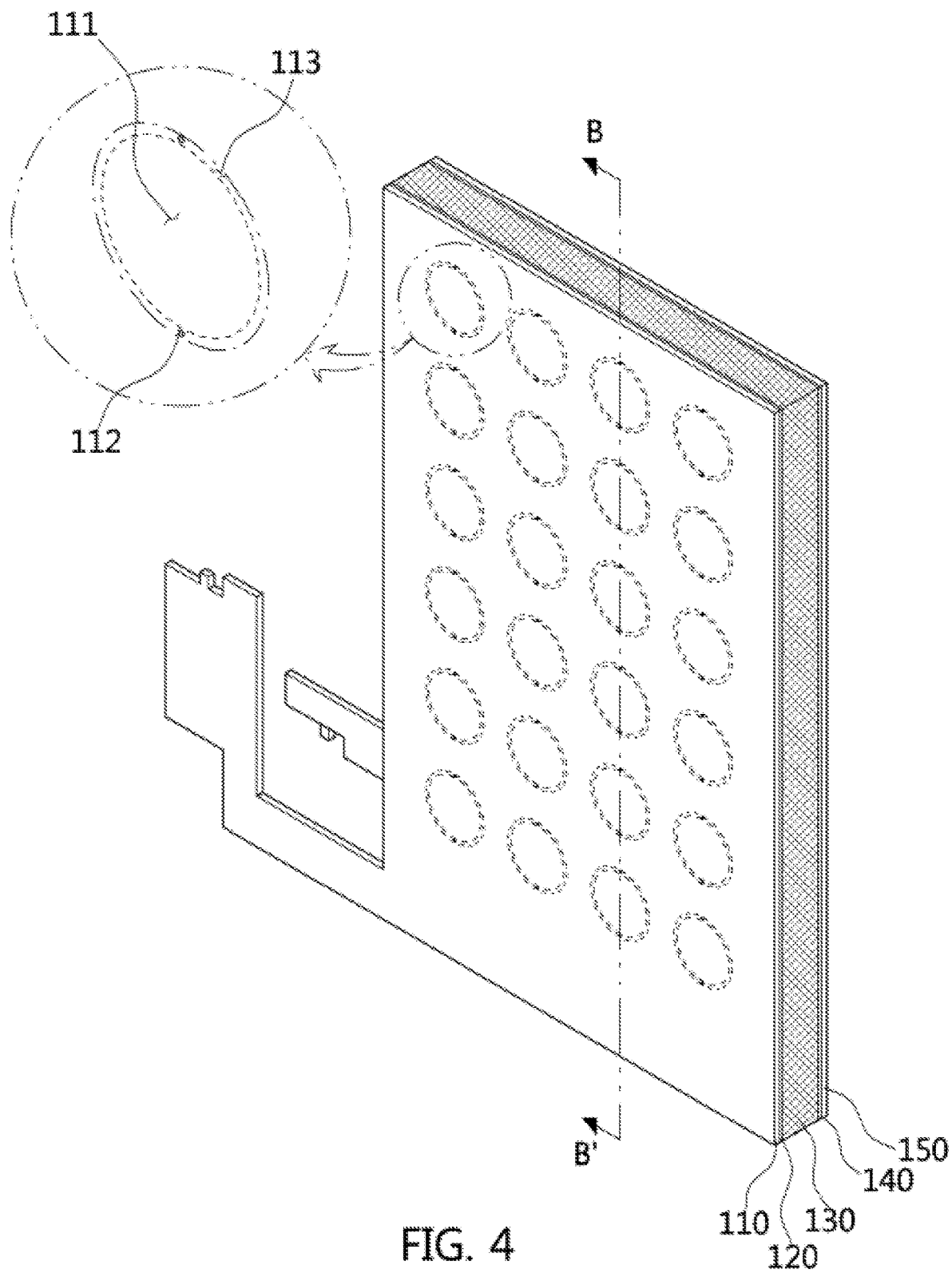
FIG. 4 is a perspective view of a touch pressure sensing apparatus according to another mode of this disclosure.
Figure 5:
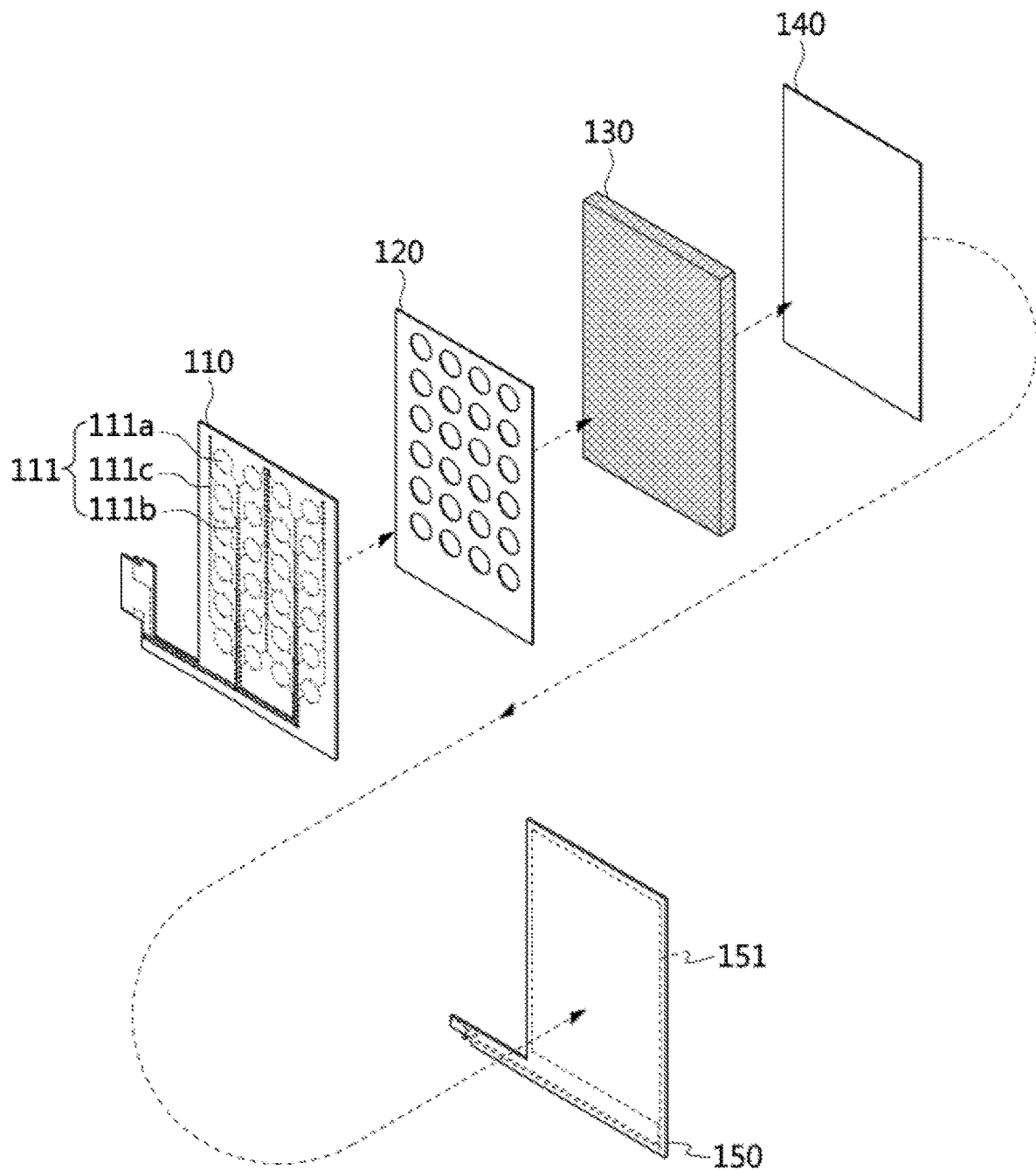
FIG. 5 is an exploded perspective view of the touch pressure sensing apparatus of FIG. 4.
Figure 6:
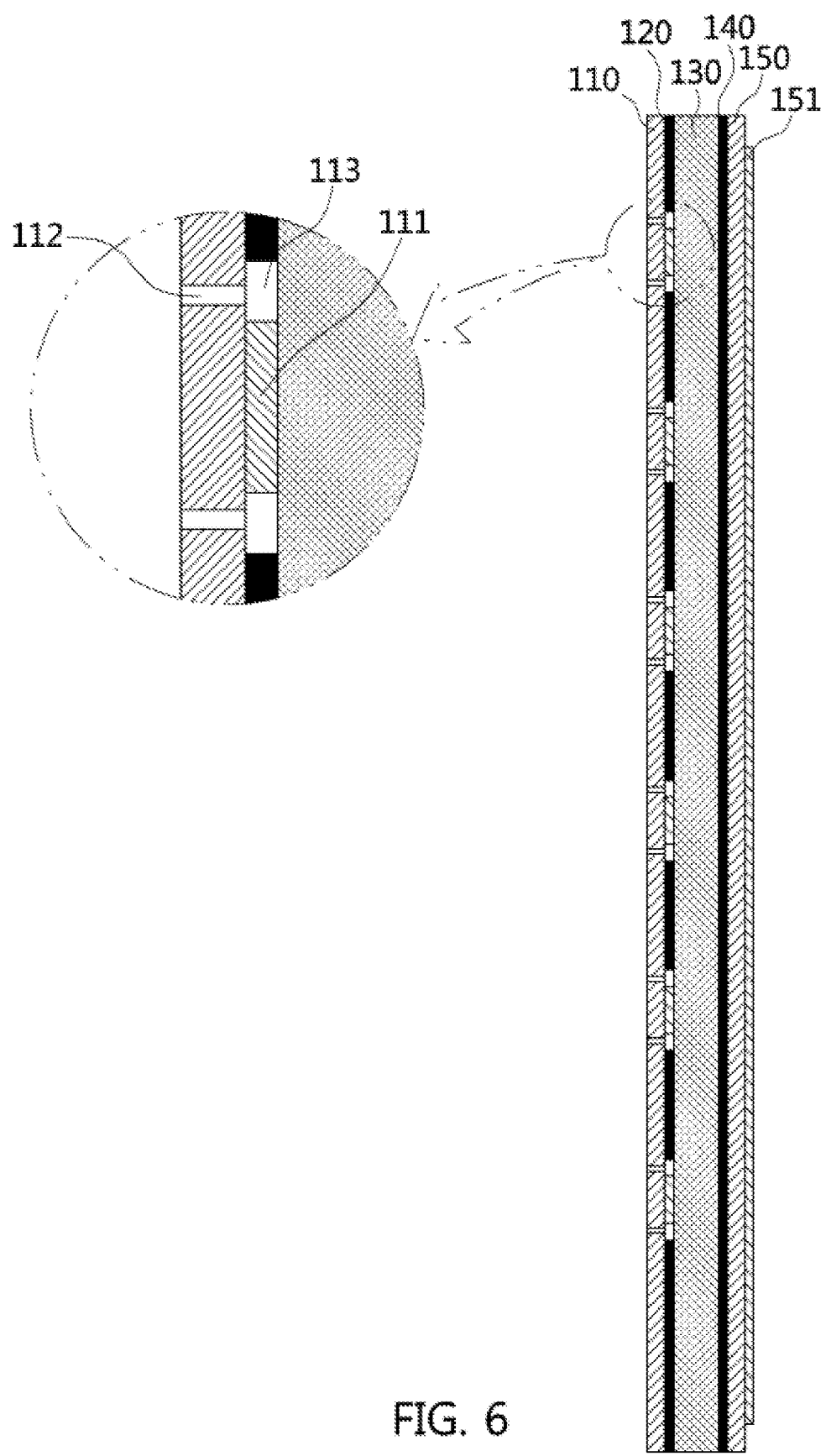
FIG. 6 is a cross-sectional view taken along a line B-B' on the touch pressure sensing apparatus of FIG. 4.

FIG. 4 is a perspective view of a touch pressure sensing apparatus according to another mode of this disclosure, FIG. 5 is an exploded perspective view of the touch pressure sensing apparatus of FIG. 4, and FIG. 6 is a cross-sectional view taken along a line B-B' on the touch pressure sensing apparatus of FIG. 4.

Referring to FIGS. 4 to 6, according to another mode of the disclosure, a touch pressure sensing apparatus 200 includes a first substrate 110, a first adhesive layer 120, a nano-membrane member 130, a second adhesive layer 140, and a second substrate 150. The first substrate 110 may be provided with the first electrode unit 111 on a surface thereof facing the nano-membrane member 130. The first electrode unit 111 includes a plurality of sensing electrodes 111a, main connection lines 111b, and dummy connection lines 111c. In this case, for each of the sensing electrodes 111a, a predetermined clearance 113 may be provided around each of the sensing electrodes 111a. The first substrate 110 may be provided with one or more substrate passing through-holes 112 which extend to the clearances 113 and through which air is introduced into and discharged outside. The second substrate 150 may be formed on a first surface or a second surface of the second electrode unit 151 wherein the first surface or the second surface is a surface facing the first electrode unit 111 of the first substrate 110 for sake of ease of designing.

Since elements shown in FIGS. 4 to 6 are almost the same as those shown in FIGS. 1 to 3, a detailed description of the same elements will be omitted. The touch pressure sensing apparatus 200 illustrated in FIGS. 4 to 6 is constructed not to include the spacer member 50 and the perimeter support member 80 shown in FIG. 3. In this case, the space between the first substrate 110 and the second substrate 150 can be reduced, so that this structure can be used in the case where a thinner structure is required.

Figure 7A:
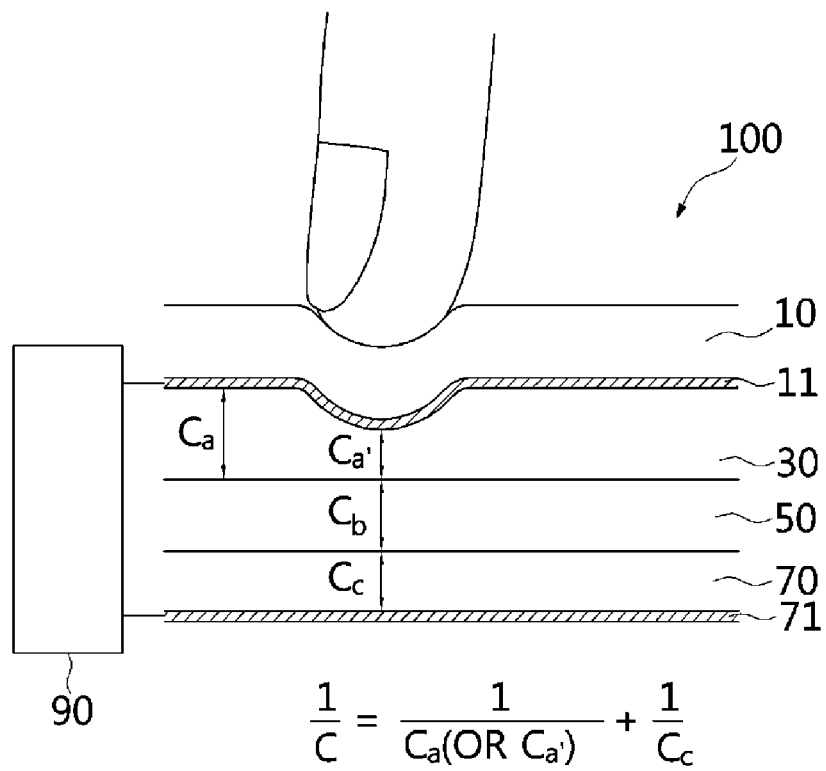
FIG. 7A and FIG. 7B are views used to describe a capacitance value of the touch pressure sensing apparatus of FIG. 1.
Figure 7B:
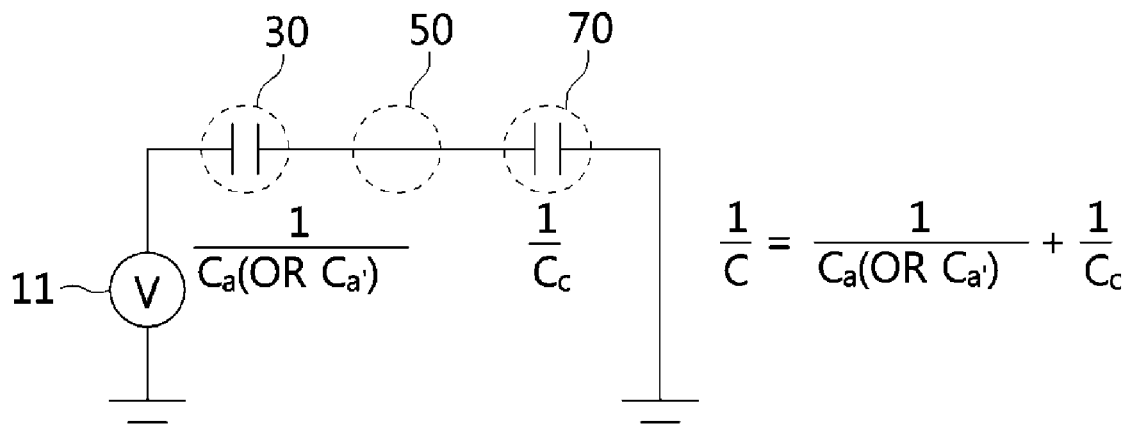

FIGS. 7A and 7B are views used to describe the capacitance value of the touch pressure sensing apparatus of FIG. 1.

Referring to FIGS. 7A and 7B, a touch pressure sensing unit 90 is connected to a first electrode unit 11 of a first substrate 10 and a second electrode unit 71 of a second substrate 70, thereby measuring a capacitance value between the first electrode unit 11 and the second electrode unit 71. The touch pressure sensing unit 90 senses the touch pressure applied by a user by measuring a change in the capacitance value attributable to the touch pressure applied by the user.

The capacitance value C between the first electrode unit 11 and the second electrode unit 71 is associated with the capacitance values Ca and Ca' of the nano-membrane member 30, the capacitance value Cb of the spacer member 50, and the capacitance value Cc of the second substrate 70. The capacitance values of the nano-membrane member 30 include the capacitance value Ca measured in a state in which the touch pressure is not applied and the capacitance value Ca' measured in a state in which the touch pressure is applied.

Since the spacer member 50 is electrically conductive, the capacitance value Cb of the spacer member 50 may be preferably subtracted from the measurement of the capacitance (see FIG. 7C). That is, since the spacer member 50 has a predetermined thickness, the gap between the first electrode unit 11 and the second electrode unit 71 is increased, so that the capacitance value C between the first electrode unit 11 and the second electrode unit 71 can be reduced. However, since the spacer member 50 is electrically conductive, the capacitance value of the spacer member 50 may be excluded from the measurement of the capacitance value. Therefore, it does not affect the capacitance value between the first electrode unit 11 and the second electrode unit 71. That is, the capacitance value measured between the first electrode unit 11 and the second electrode unit 71 may be the same as the capacitance value between the first electrode unit 11 and the second electrode unit 71 without the spacer member 50 interposed therebetween. In other words, the capacitance value C between the first substrate 10 and the second substrate 70 is associated with the capacitance values Ca and Ca' of the nano-membrane member 30 and with the capacitance value Cc of the second substrate 70, and is the same as the capacitance value of the touch pressure sensing apparatus 200 illustrated in FIGS. 4 to 6.

In the case where the second electrode unit 71 is arranged on a surface of the second substrate 70, the surface facing the first substrate 10, when measuring the total capacitance value, it is not necessary to consider the capacitance value Cc of the second substrate 70 and only the capacitances Ca and C' of the nano-membrane member 30 are considered. In this case, although the second electrode unit 71 is disposed on the upper surface of the second substrate 70, the spacer member 50 functions to raise the reference position for measuring the capacitance value of the second electrode unit 71 to the lower surface of the nano-membrane member 30.

Figure 8:
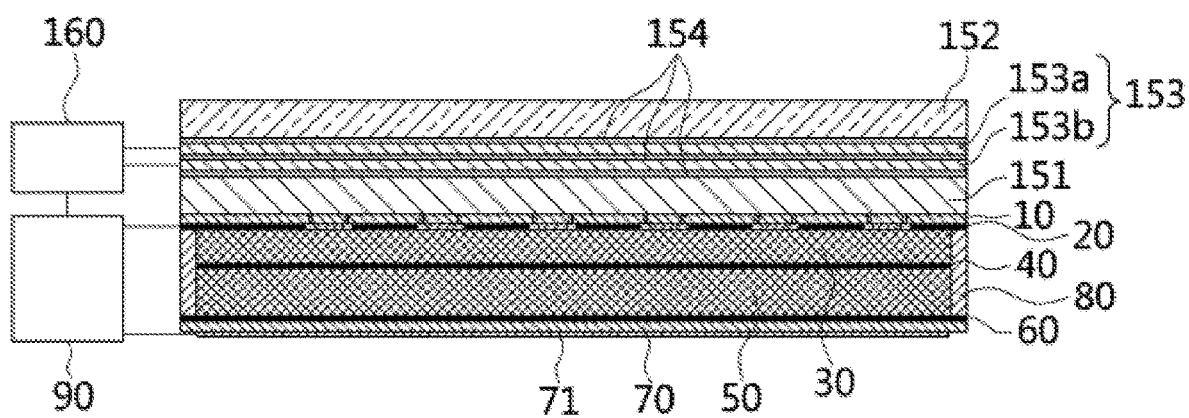
FIG. 8 is a view illustrating a touch screen panel including the touch pressure sensing apparatus according to the disclosure.

FIG. 8 is a view illustrating a touch screen panel provided with the touch pressure sensing apparatus according to this disclosure.

Referring to FIG. 8, a touch screen panel 150 including the touch pressure sensing sensor according to one embodiment of the disclosure includes a display panel unit 151 for displaying a screen on a front surface thereof, a display panel cover 152 stacked on the front surface of the display panel unit 151, and a touch sensor unit 153 arranged between the display panel cover 152 and the display panel unit 151 and sensing a touch operation performed on the display panel cover 152. The touch pressure sensing sensor 100 according to one embodiment of the disclosure may be provided on the back surface of the display panel unit 151.

The display panel unit 151 may be an LCD, for example. Alternatively, the display panel unit 151 may be an LED, or any known different panel.

The display panel cover 152 may be tempered glass, or may be a reinforced coating film prepared by forming a reinforced coating layer on a surface of a film member to increase the rigidity. The film may be a transparent film selected among, for example, a PI film, a polyethylene naphthalate (PEN) film, a polyethylene terephthalate (PET) film, a polycarbonate (PC) film, a poly styrene sulfonate (PSS), or may be a synthetic resin film on which a reinforced coating layer can be formed.

The reinforced coating layer may be a resin layer containing silicon (Si) or ceramic and being formed through a coating process. Alternatively, the reinforced coating layer may be a coating layer formed through a vacuum deposition process. Further alternatively, the reinforced coating layer may be any coating layer to increase resistance against scratches and cracks by increasing the rigidity of one surface of a film member.

The reinforced coating layer may have a thickness of 0.3 mm or less so as to be flexible and to be applied to a flexible touch screen panel.

The touch sensor unit 153 may include a first touch sensor 153a including a plurality of X-axis sensing circuits provided on a transparent film for a sensor and arranged at intervals to be parallel to each other, and a second touch sensor 153b including a plurality of Y-axis sensing circuits extending perpendicularly to the X-axis sensing circuits and being arranged at intervals to be parallel to each other.

Although not illustrated in the drawings, the touch sensor unit 153 is a sensor in which an X-axis sensing circuit and a Y-axis sensing circuit sense a user finger's touch operation performed on the display panel cover 152.

Transparent adhesive layers 154 are provided between the display panel cover 152 and the touch sensor unit 153 and between the touch sensor unit 153 and the display panel unit 151. For example, the transparent adhesive layer 154 is formed of an optically clear adhesive (OCA) film.

Since one embodiment of the touch pressure sensing sensor 100 disposed on the back surface of the display panel unit 151 has been described above, a detailed description thereof will be omitted here.

The touch screen panel 150 provided with the touch pressure sensing apparatus according to this disclosure preferably further includes a touch sensing unit 160 that is electrically connected to the touch sensor unit 153 and the touch pressure sensing unit 90, specifies a position at which the touch is sensed by the touch sensor unit 153, and generates touch pressure information for the position at which the touch is sensed.

The touch sensing unit 160 can roughly sense a touch position, and the touch sensor unit 153 can precisely specify an exact touch position within the roughly detected touch position. Therefore, the touch screen panel 150 has advantages of precisely detecting the touch position and reducing power consumption by scanning a limited area of the panel rather than scanning the entire area of the panel.

The touch pressure sensing apparatus 100 according to the disclosure is arranged between the display panel unit 151 and a stationary bracket to which the display panel unit 151 is fixed, and recognizes the back surface of the display panel unit 151 as a capacitor. Therefore, it is impossible to detect a touch position.

However, since the touch sensing unit 160 is electrically connected to the touch sensor unit 153 and the touch pressure sensing unit 90, when a touch operation is performed on the display panel cover 152, the touch sensing unit 160 reads the coordinate (X, Y) of the touch position based on the mutual capacitance value by using the touch sensor unit 153 and reads the capacitance value by using the touch pressure sensing sensor 100 disposed on the back surface of the display panel unit 151 to obtain the pressure information in a Z-axis. Thus, three-dimensional touch information of the X-axis, Y-axis, and Z-axis can be produced.

The touch pressure sensing unit 90 can distinguish two or more pressure levels. For example, the touch pressure sensing unit 90 can distinguish a heavy touch and a light touch based on a difference in touch pressure. When the light touch is performed, the touch pressure sensing unit 90 detects the pressure based on a difference in capacitance value. When the heavy touch is performed, the touch pressure sensing unit 90 detects the pressure using both of a capacitance value and a change in capacitance value.

That is, in the case of the light touch, the touch pressure is detected by scanning a self capacitance value between the first electrode unit 11 and the second electrode unit 71. On the other hand, in the case of the heavy touch, the touch pressure is detected by scanning a self capacitance value of each channel between the first electrode unit 11 and the second electrode unit 71.

More specifically, in a state(no load state) in which a user's finger is just simply put on the display panel cover 152 and nearly zero pressure is applied to the display panel cover 152, the touch sensing unit 160 detects a touch position based on the values of 781 pF and 975 Ohm. However, in the case where the user's filter presses the display panel cover 152 by a load of 15 g, the touch sensing unit 160 detects the touch operation as a light touch based on the values of 833 pF and 904 Ohm. In the case where the user's filter presses the display panel cover 152 by a load of 90 g, the touch sensing unit 160 detects the touch operation as a heavy touch based on the values of 1290 pF and 560 Ohm.

According to one embodiment of the disclosure, the touch pressure sensing unit 90 can detect two or three pressure levels in the Z-axis direction using an extra channel of a TSP control chipset of a conventional capacitive touch screen panel.

It will be appreciated by those skilled in the art that the embodiments of the disclosure described above are merely illustrative and that various modifications and equivalent embodiments are possible without departing from the scope and spirit of the invention. Therefore, it will be appreciated that this disclosure is not limited to the form set forth in the foregoing description. Accordingly, the true scope of technical protection of the disclosure should be determined by the technical idea of the appended claims. It is also to be understood that this disclosure covers all modifications, equivalents, and alternatives falling within the spirit and the scope of the present invention as defined by the appended claims.

The invention claimed is:

1. An apparatus for sensing touch pressure, the apparatus comprising:
a first substrate provided with a first electrode unit;
a second substrate provided with a second electrode unit; and
a porous membrane member provided between the first substrate and the second substrate and deformed or recovered according to a touch pressure applied to the first substrate,
wherein the membrane member is a web-shaped nano-membrane; and
a spacer member provided between the membrane member and the second substrate to space the membrane member and the second substrate from each other,
wherein the spacer member is thicker and has higher rigidity than the membrane member.

2. The apparatus according to claim 1, wherein the spacer member is made of a conductive woven fabric prepared by plating non-conductive woven fabric with a metal.

3. The apparatus according to claim 1, further comprising a perimeter support member provided between the first substrate and the second substrate and disposed to surround outer flank surfaces of the membrane member and the spacer member.

4. The apparatus according to claim 1, further comprising a first adhesive layer for bonding the first substrate and the membrane member to each other, wherein the first electrode unit comprises a plurality of sensing electrodes that are in direct contact with the membrane member.

5. The apparatus according to claim 4, wherein the first adhesive layer has an opening at a position corresponding to the sensing electrodes.

6. The apparatus according to claim 5, wherein the first substrate has one or more substrate passing-through hole extending to pass through the first substrate and being connected to the opening.

7. The apparatus according to claim 1, further comprising a lower support member provided under the second substrate.

8. The apparatus according to claim 1, wherein the second electrode unit is provided on a first surface of the second substrate, the first surface facing the first substrate.

9. The apparatus according to claim 3, further comprising: a second adhesive layer for bonding the membrane member and the spacer member to each other; and a third adhesive layer for bonding the spacer member and the second substrate to each other and for bonding the perimeter support member and the second substrate to each other.

10. The apparatus according to claim 1, further comprising a touch pressure sensing unit connected to the first electrode unit and the second electrode unit to measure a capacitance value between the first electrode unit and the second electrode unit, thereby sensing the touch pressure applied to the first substrate.

11. An apparatus for sensing touch pressure, the apparatus comprising: a first substrate provided with a first electrode unit; a second substrate provided with a second electrode unit; a porous membrane member provided between the first substrate and the second substrate and configured to deform or revert according to a magnitude of touch pressure applied to the first substrate; and conductive powder dispersed in the membrane member, the conductive powder enabling implementation of an additional mode using an electric short between the first electrode unit and the second electrode unit besides a touch pressure sensing mode in which the touch pressure is sensed by detecting a change in capacitance value between the first electrode unit and the second electrode unit according to the touch pressure applied to the first substrate,
wherein the membrane member is a web-shaped nano-membrane.

12. The apparatus according to claim 11, further comprising a spacer member provided between the membrane member and the second substrate to space the membrane and the second substrate from each other.

13. The apparatus according to claim 11, further comprising a first adhesive layer for attaching the first substrate and the membrane member to each other, wherein the first electrode unit includes a plurality of sensing electrodes that are in direct contact with the membrane member.

14. The apparatus according to claim 13, wherein the first adhesive layer has an opening at a position corresponding to the sensing electrodes.

15. The apparatus according to claim 14, wherein the first substrate has one or more substrate passing-through holes extending to pass through the first substrate and being connected to the opening.

* * * * *